US008145788B1

(12) United States Patent
Love et al.

(10) Patent No.: US 8,145,788 B1
(45) Date of Patent: Mar. 27, 2012

(54) DISTRIBUTED ISP LOAD BALANCER

(75) Inventors: Philip Love, Alhambra, CA (US); Yuxiang Robin Ren, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 2065 days.

(21) Appl. No.: 10/180,639

(22) Filed: Jun. 24, 2002

Related U.S. Application Data

(60) Provisional application No. 60/384,974, filed on May 31, 2002.

(51) Int. Cl.
*G06F 15/173* (2006.01)
*G06F 15/16* (2006.01)
(52) U.S. Cl. .................. 709/241; 709/217; 709/219
(58) Field of Classification Search .................. 709/241, 709/217, 219, 238
See application file for complete search history.

(56) References Cited

U.S. PATENT DOCUMENTS

| | | | | |
|---|---|---|---|---|
| 5,686,902 | A * | 11/1997 | Reis et al. | 340/10.2 |
| 5,774,660 | A | 6/1998 | Brendel et al. | 395/200.31 |
| 6,304,913 | B1 * | 10/2001 | Rune | 709/241 |
| 6,317,792 | B1 * | 11/2001 | Mundy et al. | 709/227 |
| 6,424,993 | B1 * | 7/2002 | Weber | 709/203 |
| 6,665,702 | B1 * | 12/2003 | Zisapel et al. | 718/105 |
| 6,747,957 | B1 * | 6/2004 | Pithawala et al. | 370/252 |
| 6,779,034 | B1 * | 8/2004 | Mundy et al. | 709/227 |
| 6,914,886 | B2 * | 7/2005 | Peles et al. | 370/254 |
| 6,985,963 | B1 * | 1/2006 | Johnson et al. | 709/242 |
| 2003/0003933 | A1 * | 1/2003 | Deshpande et al. | 455/510 |

OTHER PUBLICATIONS

RFC 2925, K White, Sep. 2000, Network Working Group, IBM Corporation (1-72).*
Thomas M. Chen, Jan. 2001, Communications of the ACM, vol. 44, No. 1.*
Henrik Lundgren, Sep. 2002, ACM 1-58113-474-6/02/0009.*
BEA Systems, Inc., "Achieving scalability and high availablility for e-commerce and other web applications," Jun. 1999.
Cisco Systems, Inc., "Catalyst 6000 family accelerated server load balancing," (1999).
Harbaugh, L., "Get the low down: The inside facts on load-balancing routers and routing appliances," Apr. 24, 2002.
Intel Corporation, "Planning and building a data center: Meeting the e-business challenge," (2000).

* cited by examiner

*Primary Examiner* — Asghar Bilgrami
(74) *Attorney, Agent, or Firm* — Barry N. Young

(57) ABSTRACT

The present invention relates to a device and method for managing inbound and outbound communications for a multi-homed network. A connection manager is located on a local network that is connected to an external network, such as the Internet, through multiple service provider connections. The connection manager intercepts all communication packets that are inbound to the local network from the external network and all packets that are outbound from the local network to the external network. The connection manager then associates the packets with a particular ISP connection based on the availability and bandwidth load status of the ISP connections.

25 Claims, 17 Drawing Sheets

DISTRIBUTED ISP LOAD BALANCER

REFERENCE TO PRIORITY DOCUMENT

This application claims priority of co-pending U.S. Provisional patent application Ser. No. 60/384,974 entitled "Distributed ISP Load Balancer" by P. Love et al., filed May 31, 2002. Priority of the filing date of May 31, 2002 is hereby claimed, and the disclosure of the Provisional patent application is hereby incorporated by reference.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates generally to computer networks and, more particularly, to managing Internet connections in a multi-homed computer network.

2. Description of the Related Art

In recent years, enterprises have become more and more dependent on Internet-based applications such as e-mail and the World Wide Web. With this growing dependence, the impact of Internet downtime on enterprises has also grown. An enterprise typically gains access to the Internet through an Internet Service Provider (ISP). Many enterprise offices have only one connection to a single ISP regardless of the number of users in the enterprise, and therefore a failure of that connection can cause substantial inconvenience and loss of productivity for the enterprise and its employees. If the enterprise is involved in e-commerce, a failed Internet connection can also result in lost revenue and dissatisfied customers.

Because of technical realities, an ISP cannot guarantee one hundred percent uptime for its Internet connection. Consequently, sporadic periods of Internet downtime have become an accepted fact of life for enterprises with a single Internet connection. Furthermore, the penalties for an ISP breaking a service level agreement usually do not adequately compensate an enterprise for the negative impact of a downed Internet connection. Another downside of a single Internet connection is that many enterprises have outgrown the bandwidth capacity of a single connection, which results in sluggish response times when enterprise employees access the Internet.

As a result, enterprises are increasingly instituting multiple Internet connections using multiple ISPs in order to provide increased reliability and increased bandwidth capacity. A computer network with such a multi-link, multi-ISP configuration is commonly referred to as a "multi-homed" network. An example of this configuration is shown in FIG. 1, which shows a local area network (LAN) that is connected to the Internet through two separate ISPs, ISP 1 and ISP 2. Each ISP is connected to the LAN through a dedicated network connection via a local access router. Each of the ISPs typically assigns the LAN a range of publicly-accessible IP addresses for use by the owner of the LAN. Thus, a multi-homed LAN owner is assigned multiple sets of discontiguous IP addresses, each of which is accessible only through the ISP that assigned the set. The computers on the LAN may use private, non-routable IP addresses that are different from the public IP addresses assigned by the ISP. As a result, the LAN is required to conduct proper IP address management for every packet that is sent and received with respect to the LAN.

A multi-homed network provides advantages over a network having a single Internet connection through a single ISP. One advantage relates to reliability, as the multi-connection Internet setup provides redundancy with respect to the network's Internet connection. That is, if one of the ISP connections becomes unavailable, the other ISP connection can serve as a backup Internet connection. Another advantage of multi-homing is increased bandwidth over a single Internet connection. A net increase in bandwidth results where an enterprise can utilize the bandwidth of all Internet connections in a multi-homed system.

Despite the advantages that a conventional multi-homed system provides over a single Internet connection, there are also drawbacks associated with a conventional multi-homed system. One such drawback, described with reference to FIG. 1, relates to the processing of outbound message traffic in the multi-homed network. Assume a user uses Host B in FIG. 1 to access a public Web site hosted on Host A, which is external to the LAN. In a conventional multi-homed system, the Host B sends all of its Internet-bound message traffic to one of the local access routers as its default gateway, such as to the router for ISP 1. Thus, the Host B is essentially "locked" to ISP 1, so that ISP 1 represents a single point-of-failure for Host B. Moreover, where the LAN includes multiple host machines, there is no dynamic load balancing between the ISPs. Rather, some of the hosts are fixedly assigned to one ISP and other hosts are fixedly assigned to another ISP, which only provides static load balancing. Thus, this setup does not intelligently protect against ISP failure nor does it provide intelligent load balancing.

Another drawback relates to inbound traffic. With reference still to FIG. 1, assume that Host A is an end-user computer that accesses a public Web site hosted by Host B on the LAN. When Host A attempts to establish an Internet connection with Host B, Host A performs a domain name lookup through Domain Name Service (DNS) to find the IP address of Host B based on a domain name, as will be known to those skilled in the art. As discussed, Host B's actual IP address may be private and non-routable on the Internet, so the DNS server for Host B's domain must return an address from one of the public address ranges assigned to Host B by ISP 1 or ISP 2, and the local access routers must be configured to map that public address to Host B using network address translation (NAT). However, Host A might only use one public address to access Host B. If a failure makes that one address unreachable, then Host A will be unable to reach Host B over the Internet, thereby effectively shutting down Host B with respect to Host A.

One way of overcoming such problems is through the use of Border Gateway Protocol (BGP), which is an Internet protocol that is commonly used between different ISPs to enable groups of routers to share routing information. However, the use of BGP has a high cost and is quite complex, which tends to scare away enterprises from multi-homing using BGP. Moreover, the use of BGP requires the cooperation of multiple ISPs, which can be burdensome, particularly for smaller enterprises.

From the discussion above, it should be apparent that there is a need for a more efficient method of managing the Internet connections in a multi-homed computer network.

SUMMARY

The present invention relates to a device and method for handling inbound and outbound communications for a multi-homed network. A multi-homed local network is connected to an external network, such as the Internet, through multiple service provider connections via a connection manager. The connection manager intercepts all communication packets that are inbound to the local network from the external network and all packets that are outbound from the local network to the external network. The connection manager associates the packets with a particular service provider connection based on the availability and bandwidth load status of the service provider connections, which are determined by the connection manager.

In one aspect of the invention, the connection manager handles communication packets that are outbound from the local network toward the external network. The connection manager selects a particular service provider for handling the outbound packet based upon the bandwidth load and availability of all the service provider connections. For example, the connection manager can select the service provider that has the lowest bandwidth load among the available service providers. The connection manager also can manage discontiguous pools of network addresses by translating and mapping internal network addresses to external addresses associated with an available service provider.

In another aspect of the invention, the connection manager can handle inbound communications, such as a data packet that relates to a DNS query request to translate a domain name into an IP address associated with the domain name. The connection manager intercepts DNS query requests and resolves the DNS queries based on the bandwidth load and availability status of the service providers. The connection manager resolves the DNS queries to network addresses that are associated with an available service provider having a low bandwidth load.

Other features and advantages of the present invention should be apparent from the following description, which illustrates, by way of example, the principles of the invention.

BRIEF DESCRIPTION OF THE DRAWINGS

FIG. 6 shows a screen shot of a display page from a graphical user interface that may be used to provide ISP configuration information for the connection manager.

FIG. 7 shows a screen shot of a display page from a graphical user interface that displays ISP configuration information for ISPs connected to a LAN managed by the connection manager.

FIG. 9 shows a screen shot of a display page from a graphical user interface that may be used to defined dynamic network address translation (NAT) rules for the connection manager.

FIG. 13 shows a screen shot of a display page from a graphical user interface that may be used to define DNS settings for the connection manager.

DETAILED DESCRIPTION

Figure 2:
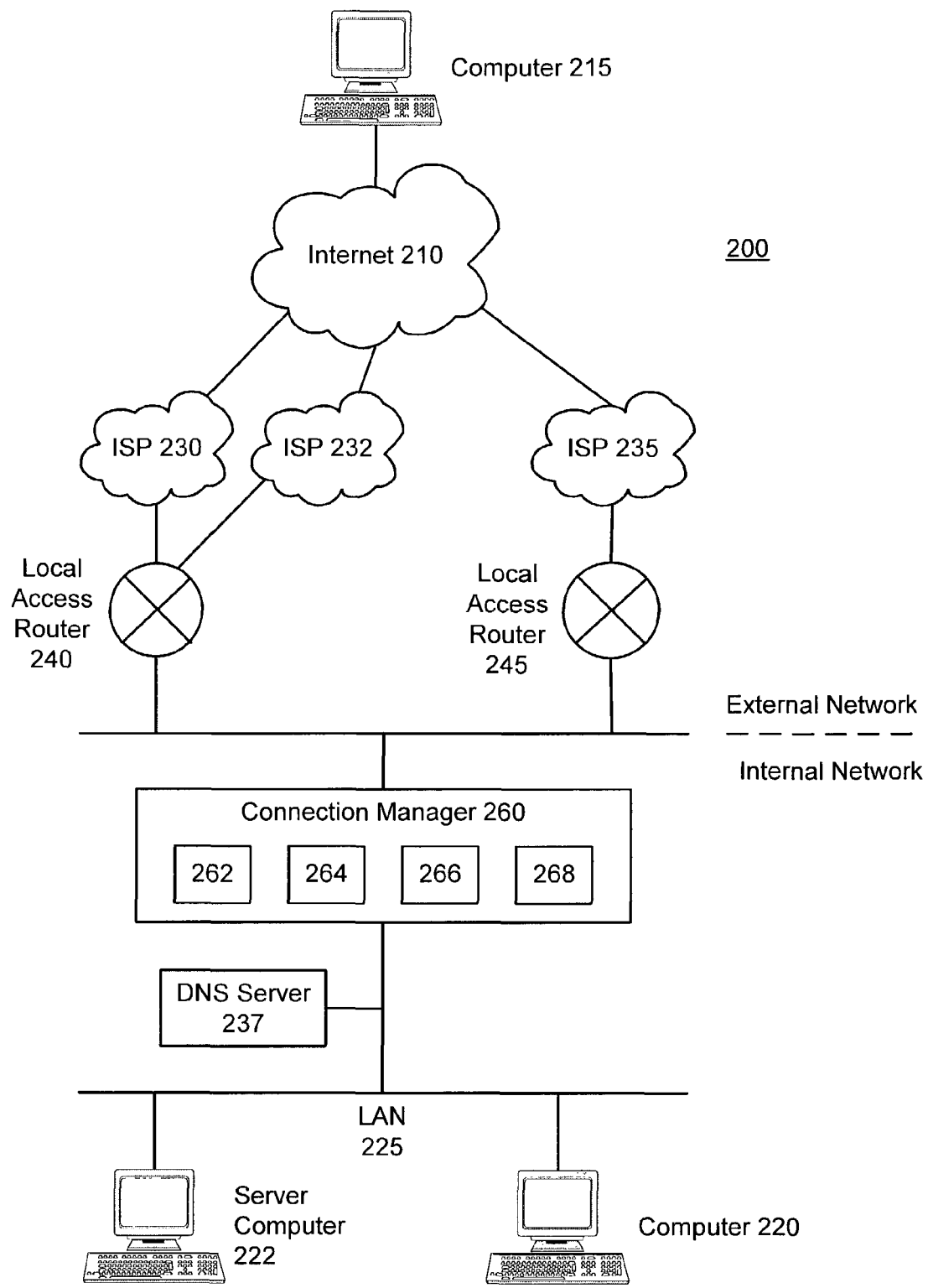
FIG. 2 is a diagram of a multi-homed network system employing a connection manager according to one aspect of the invention.

FIG. 2 is a block diagram of a computer network system 200 suitable for carrying out the processing in accordance with one aspect of the present invention. The computer network system 200 is comprised of one or more computers that are nodes of a computer network, such as the Internet 210. The computers include a computer 215 that is communicatively linked to the Internet 210, as well as a local computer 220 and a local server computer 222 that are also communicatively linked to the Internet 210. The local computer 220 and local server computer 222 are part of a local area network (LAN) 225 that can gain access to the Internet 210 (which is an external network with respect to the LAN 225) through multiple Internet Service Providers (ISPs), such as a first ISP 230, a second ISP 232, and a third ISP 235. In this regard, the LAN 225 communicatively connects to the first ISP 230 and second ISP 232 via a data path that includes a local access router 240. The LAN 225 communicatively connects to the third ISP 235 via a data path that includes the second local access router 245. The local access routers 240, 245 and the respective ISPs 230, 232, 235 form data paths that connect the LAN 225 to the Internet 210. A DNS server 237 is coupled to the LAN 225. The DNS server 237 is the authoritative DNS server for domains of Web servers that are hosted on the LAN 225. Although FIG. 2 shows only two computers on the LAN 225, it should be appreciated that the LAN 225 could include any number of computers.

In accordance with one aspect of the invention, a connection manager 260 is interposed in the communication path between the LAN 225 and the local access routers 240, 245 such that all communications between the LAN 225 and the Internet 210 must pass through the connection manager 260. The connection manager 260 is also coupled to the LAN such that the connection manager 260 can intercept all DNS queries from the Internet 210 to the DNS server 237 hosted on the LAN 225. FIG. 2 shows the DNS server 237 as being separate from the connection manager 260, although the DNS can be incorporated into the connection manager 260.

The connection manager 260 includes one or more computers or machines that perform processes described herein.

FIG. 2 shows the connection manager 260 as having four machines 262, 264, 266, 268, but it should be understood that a lesser or greater number of machines also could be provided to comprise the connection manager 260. Moreover, the four machines together collectively operate as a "connection manager", but it should be understood that each of the machines 262, 262, 266, 268 also constitutes a fully functional connection manager of its own and the machines are sometimes referred to herein as "connection managers". Each of the four machines 262, 264, 266, 268 is configured to perform the functionality of the connection manager 260 as described herein. The use of multiple machines in the connection manager 260 provides for fail-over security should one of the machines fail. The machines can be configured to share state information so that one of the machines can take over the duties of a machine that has failed. References to "cluster" in connection with the connection manager will be understood to refer to the connection manager machines 262, 264, 266, 268 collectively, as a group, rather than individually.

Exemplary Connection Manager Architecture and Hardware Design

Figure 3:
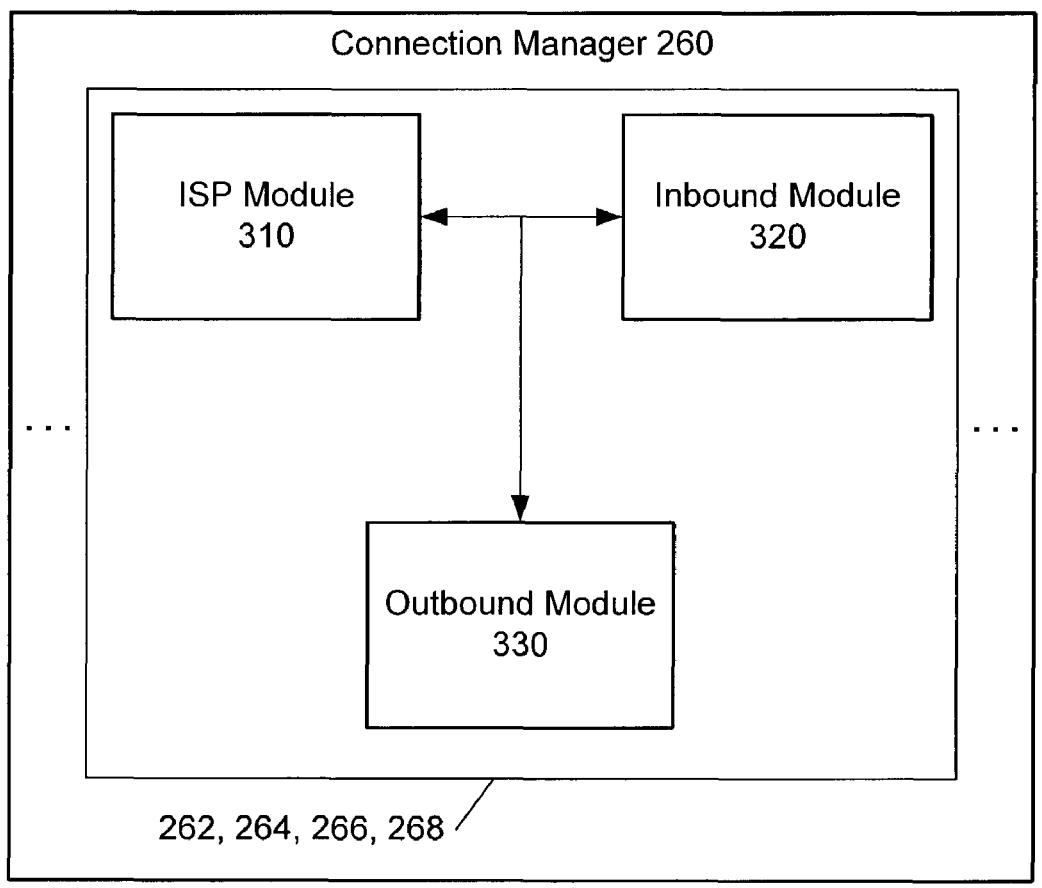
FIG. 3 is a block diagram of the system architecture of the connection manager.

FIG. 3 is a block diagram of the operational architecture of the connection manager 260 as installed on one of the exemplary machines 262, 264, 266, 268, which can comprise a conventional Internet protocol-enabled computer capable of network communications, as described more fully below. The connection manager 260 includes one or more processes comprising an ISP module 310 that keeps track of configuration information for each ISP that is connected to the LAN 225. The types of ISP configuration information to be tracked is described more fully below with reference to the flow diagram shown in FIG. 4. The ISP module 310 also keeps track of the availability status and the bandwidth load status of each of the ISPs. The ISP module 310 communicates data indicative of the ISP availability and bandwidth status to other modules of the connection manager 260.

The connection manager 260 also includes one or more processes comprising an inbound module 320 that is in charge of processing inbound communications, such as data packets, from the Internet 210. As used herein, the term "inbound" refers to communications that are directed into the LAN 225 from the Internet 210. Thus, the inbound direction is toward the LAN from the Internet 210. For example, a communication that originates at the computer 215 (shown in FIG. 2) and that is sent to the local computer 220 will be an inbound communication. Those skilled in the art will appreciate that a communication can be in the form of a packet comprised of a unit of data. The term "outbound" refers to communications that are directed toward the Internet 210 from the LAN 225. The inbound module 320 performs proxy duties for an authoritative DNS server and modifies replies from the DNS server to resolve requests for IP addresses to reachable IP addresses. The inbound module also assigns incoming connections from among a pool of IP addresses in order to balance the connection load among the ISPs that are connected to the LAN.

The connection manager 260 further includes one or more processes comprising an outbound module 330 that is in charge of processing outbound connections from the LAN 225. The outbound module 330 performs translation of network addresses from internal network address to external addresses for packets that are transmitted by computers on the LAN toward the Internet 210. In performing the translations, the outbound module 330 considers the availability of each ISP connection and the current bandwidth load on each ISP connection.

Figure 4:
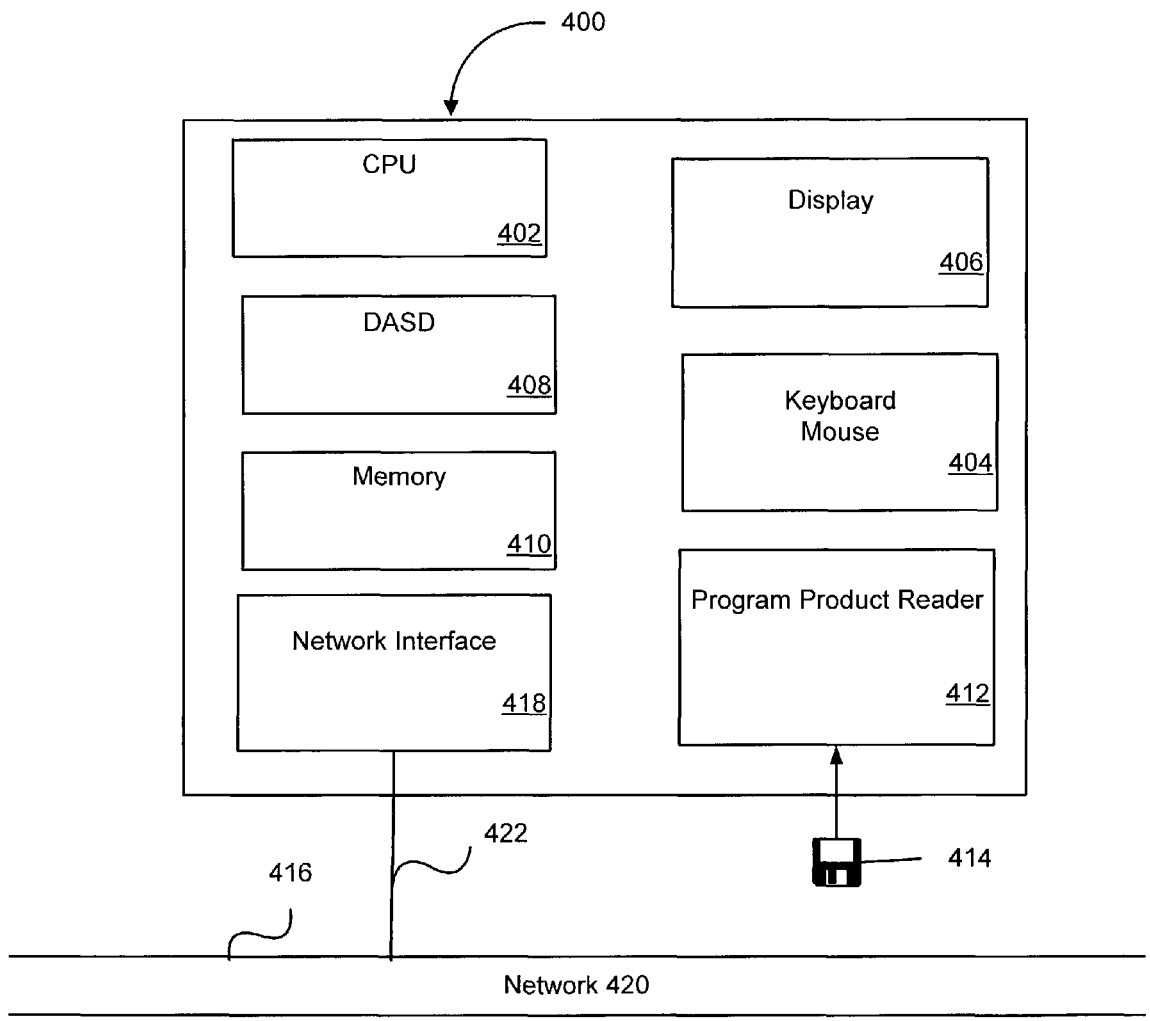
FIG. 4 is a block diagram of a connection manager computer of the connection manager.

FIG. 4 is a block diagram of a connection manager computer of the connection manager 260 shown in FIG. 2, illustrating the hardware components for one of the computers. Those skilled in the art will appreciate that the connection manager computers 262, 264, 266, 268 and the computers 215, 220 can all have a similar computer construction to the computer shown in FIG. 4.

FIG. 4 is a block diagram of an exemplary computer 400 such as might comprise any of the computers shown in FIG. 2. The computer 400 operates under control of a central processor unit (CPU) 402. The configuration of the computer can vary. In one embodiment, the computer 400 is a PC-compatible computer that has a Pentium III processor operating at a 450 MHz or higher level and that has at least 128 Mbytes of RAM. The connection manager 260 can run on a variety of operating systems, such as on at least the following software platforms: Windows 2000 Professional, Windows 2000 Server and Windows 2000 Advances Server by Microsoft, Inc., or the Linux software distribution by Red Hat, Inc. The computer 400 can have at least 256 Mbytes of RAM when operating under the Windows 2000 Server or Advanced Server platforms. In one configuration, the computer 400 has at least 5 GB of hard disk space.

With reference still to FIG. 4, a computer user can input commands and data from input device(s) such as a keyboard and/or computer mouse 404, and can view inputs and computer output at a display 406. The display is typically a video monitor or flat panel display. The computer 400 also includes a direct access storage device (DASD) 408, such as a hard disk drive. The memory 410 typically comprises volatile semiconductor random access memory (RAM). Each computer can include a program product reader 412 that accepts a program product storage device 414, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 400 can communicate with the others over a computer network 420 (such as the Internet or an intranet) through a network interface 418 that enables communication over a connection 422 between the network 420 and the computer. The network interface 418 typically comprises, for example, a Network Interface Card (NIC) or a modem that permits communications over a variety of networks.

The CPU 402 operates under control of programming steps that are temporarily stored in the memory 410 of the computer 400. When the programming steps are executed, the computer performs its functions. Thus, the programming steps implement the functionality of the connection manager described above. The programming steps can be received from the DASD 408, through the program product storage device 414, or through the network connection 422. The program product storage drive 412 can receive a program product 414, read programming steps recorded thereon, and transfer the programming steps into the memory 410 for execution by the CPU 402. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 410 over the network 420. In the network method, the computer receives data including program steps into the memory 410 through the network interface 418 after network communication has been established over the network connection 422 by well-known methods that will be understood by those skilled in the art without further explanation. The program steps are then executed by the CPU 402 thereby comprising a computer process.

It should be understood that all of the computers of the system illustrated in FIG. 2 can have a construction similar to that shown in FIG. 4, so that details described with respect to the computer 400 will be understood to apply to all computers 215, 220, 262, 264, 266, 268 of the system 200. Alternatively, any of the computers can have an alternative construction, so long as they can communicate with the other computers and support the functionality described herein.

Configuring the Connection Manager

Figure 5:
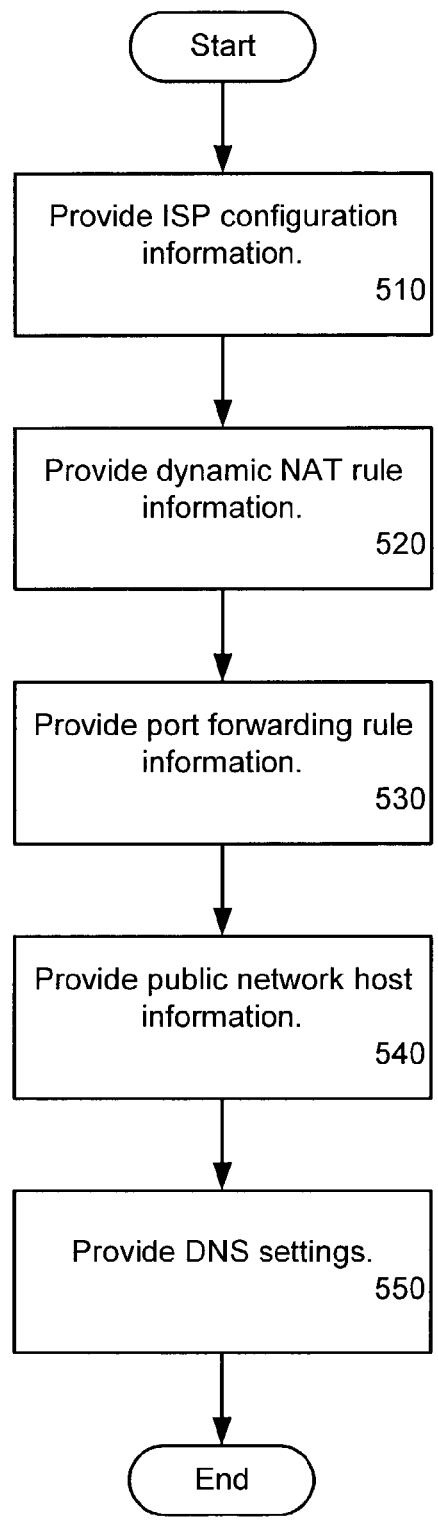
FIG. 5 is a flow diagram that describes the processes involved with a method for configuring the connection manager for use with a multi-homed network.

FIG. 5 is a flow diagram that describes the operations involved with a method for configuring the connection manager 260 for operation on the LAN 225 so that the connection manager 260 can manage multiple ISP connections. The configuration process can be performed by a user, such as a system administrator that has been granted authorization and access rights pertaining to the configuration process. The connection manager 260 can provide a graphical user interface (GUI) through which the system administrator can configure the connection manager 260 using one of the connection manager machines 262, 264, 266, 268 or using a computer on the LAN 225. Exemplary screen shots for a connection manager GUI are shown and described herein, although it should be appreciated that the user interface can vary from that shown.

In the first operation, represented by the flow diagram box numbered 510 of FIG. 5, the system administrator provides configuration information for each of the ISPs connected to the LAN 225. The ISP configuration information comprises one or more properties pertaining to each ISP. The ISP properties include:

1. Name—this is a name that is used to identify the ISP. The system administrator can arbitrarily select a name for each ISP, although each ISP should have a different name.
2. Public IP address range—the public IP address range is typically provided to the LAN by the ISP and comprises a block of IP addresses that span a range to thereby define an IP address space.
3. Hide IP address—this is an IP address that will be publicly advertised on the Internet 210 for the LAN 225 in connection with the ISP. The system administrator typically selects the Hide IP address from the public IP address range (or from the local access router range, if present, as described below).
4. Inbound bandwidth—this is the maximum allowable bandwidth for inbound connections to the LAN 225 from the Internet 210 via the ISP, which can be specified in any suitable units, such as, for example, kilobytes per second (Kb/s).
5. Outbound bandwidth—this is the maximum allowable bandwidth for outbound connections from the LAN 225 to the Internet 210 via the ISP.

Figure 6:
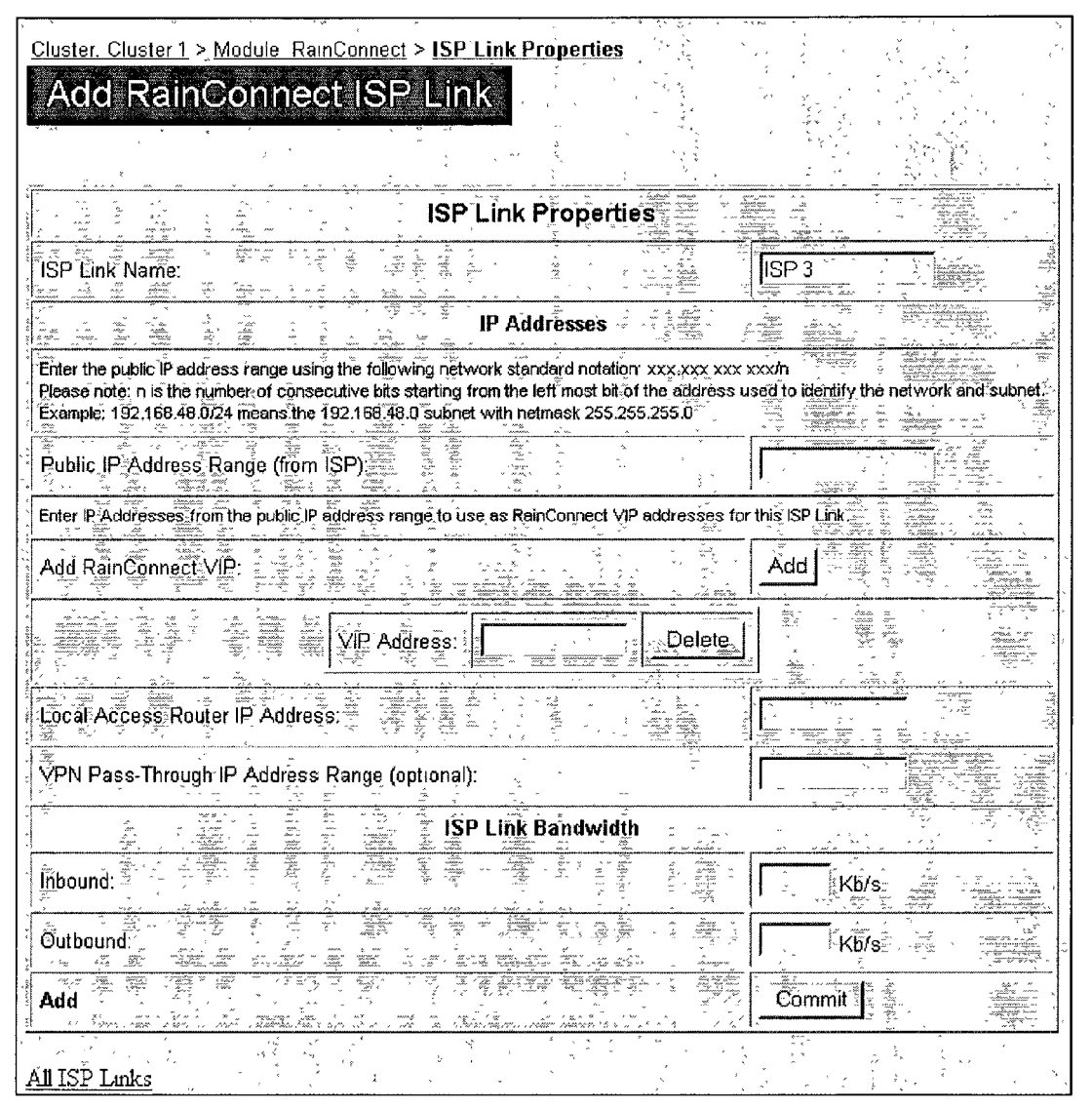
Figure 7:
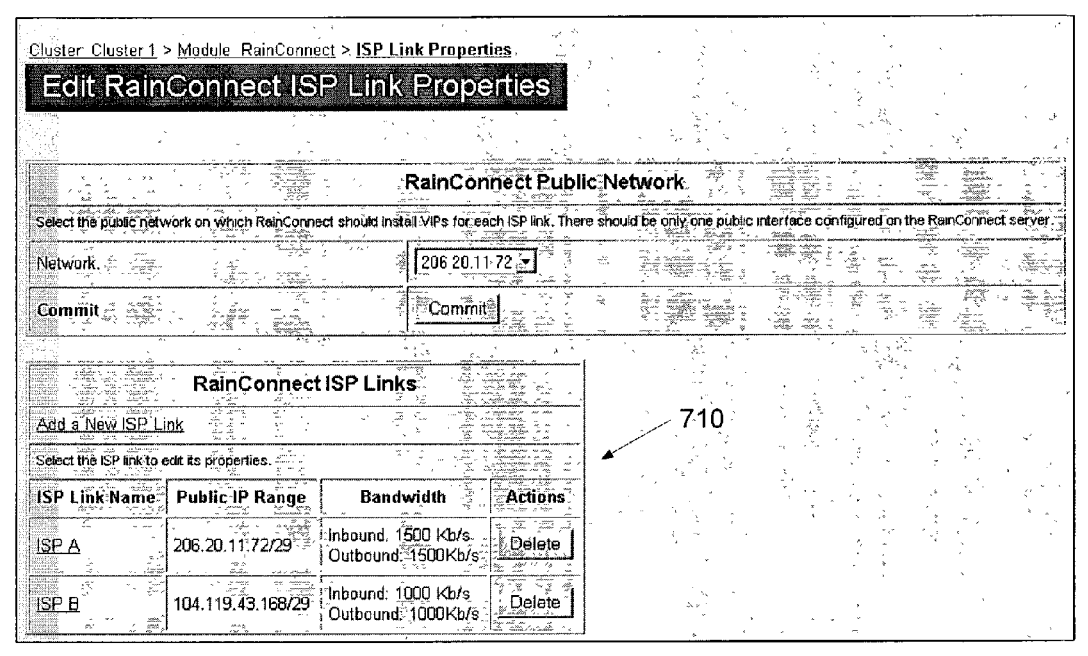

If a local access router is used to isolate the LAN 225 from the Internet 210, then a local access router IP address is also provided by the system administrator. It should be appreciated that additional ISP properties can also be provided by the system administrator. FIG. 6 shows a screen shot of a display page from an exemplary GUI that may be used to provide the ISP configuration information to the connection manager 260. The system administrator provides the configuration information for each ISP that is connected to the LAN 225 and that is managed by the connection manager 260. In this regard, the connection manager GUI can also include at least one screen interface that lists the ISPs that are managed by the connection manager 260 along with the corresponding properties. FIG. 7 shows a screen shot of a display page from an exemplary GUI that displays an ISP list in the form of a table 710.

In one embodiment of the ISP configuration operation represented by the flow diagram box 510 of FIG. 5, the system administrator also provides ISP monitor settings that the connection manager 260 uses to monitor the availability of ISPs that have been configured. As described below with reference to the flow diagram of FIG. 16, the connection manager 260 monitors the availability of the ISPs by periodically sending a Packet Internet Groper (Ping) message to one or more IP addresses that are located along each respective ISP's data path. The system administrator provides the following ISP monitor settings:

1. Ping frequency—This is the frequency at which the connection manager will ping the ISP IP addresses, and can be expressed in any time unit, such as seconds.
2. Warning threshold—The connection manager can issue a warning that the ISP is unhealthy if an error ratio falls below a warning threshold. The error ratio is defined as the quantity of ping responses received divided by the quantity of ping messages sent for a given IP address.
3. Error threshold—The error threshold defines when the connection manager will designate an ISP as unavailable. The error threshold is based on the error ratio. If the error ratio for an ISP's particular IP address falls below the error threshold, the connection manager may designate the ISP as unavailable.
4. Hold down timer—This is the length of time that must pass before the connection manager will designate an ISP as available, after the ISP error ratio has come back up above the error threshold.

Figure 8:
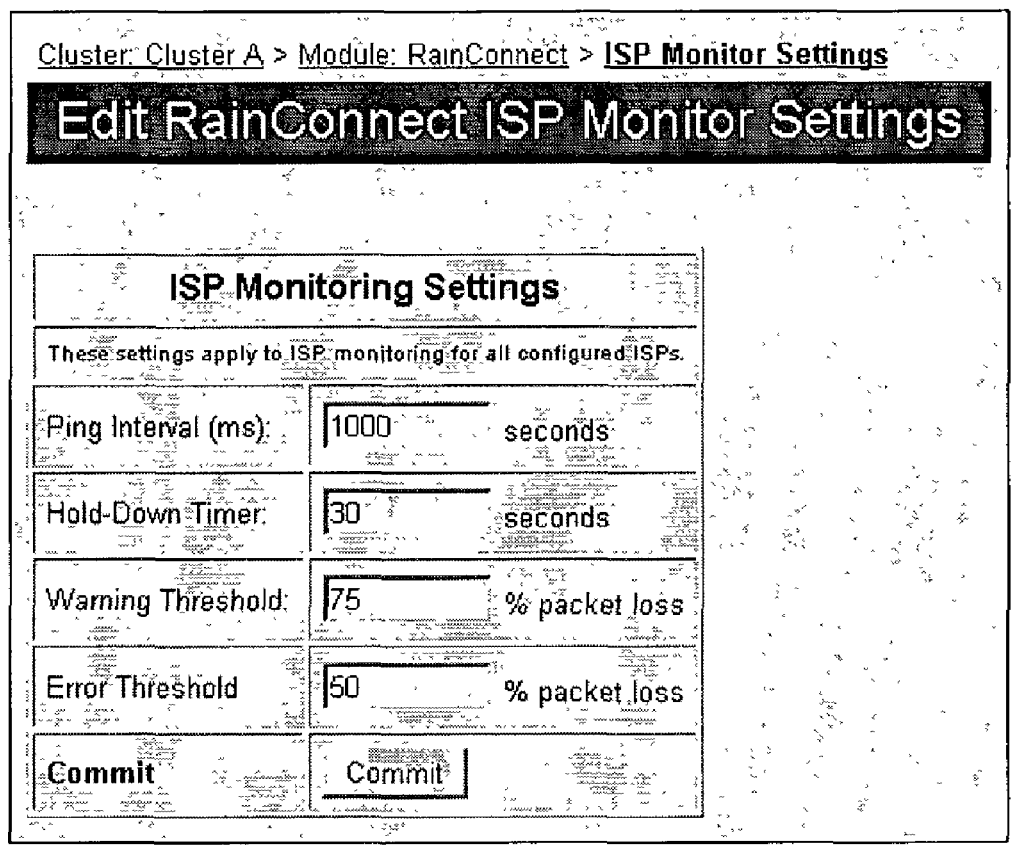
FIG. 8 shows a screen shot of a display page from a graphical user interface that may be used to provide ISP monitor settings for the connection manager.

FIG. 8 shows a screen shot of a display page from an exemplary GUI that may be used to facilitate entry of ISP monitor settings.

With reference again to FIG. 5, in the next operation of the configuration process, represented by the flow diagram box numbered 520, the system administrator provides one or more dynamic network address translation (NAT) rules. The connection manager 260 uses dynamic NAT rules to determine which ISP should be used for transporting outgoing packets to the Internet 210 from the LAN 225. Each dynamic NAT rule is defined by a set of packet properties, including a source IP address, a source mask, a source port, a destination IP address, a destination mask, a destination port, and a protocol. As described below, an outbound packet is said to "match" a dynamic NAT rule when the outbound packet's source IP address, source port, and protocol are identical to the source IP address, source port, and protocol of the dynamic NAT rule.

Figure 9:
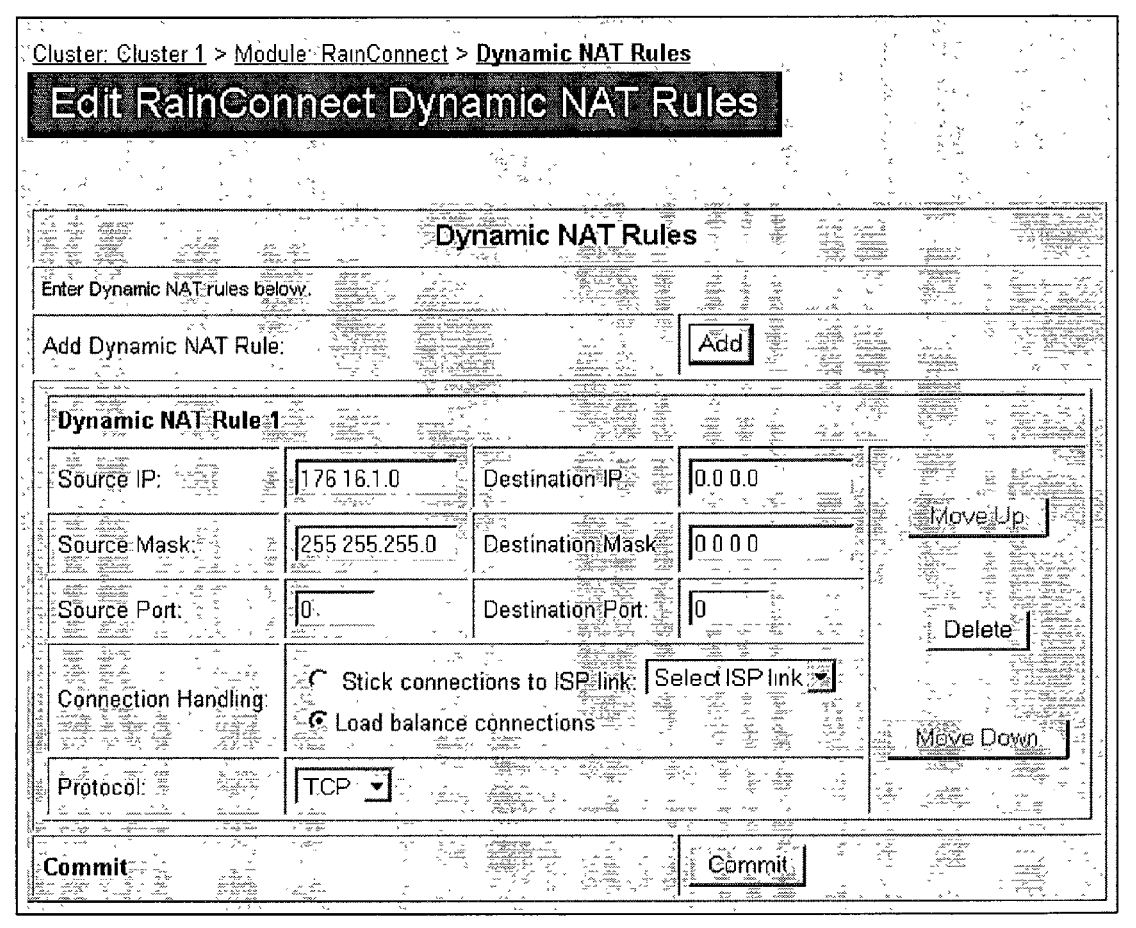

In addition to specifying the packet properties for the dynamic NAT rule, the system administrator also selects a connection handling parameter for each dynamic NAT rule, which specifies how the connection manager 260 handles outgoing packets that match the dynamic NAT rule. The system administrator may select from either of two possible settings for the connection handling parameter. The first setting specifies that the connection manager 260 should always route packets that match the dynamic NAT rule to an ISP specified in the rule. The second setting specifies that the connection manager should load balance packets that match the dynamic NAT rule. That is, the connection manager will route packets that match the rule to the ISP connection that is determined to have the lowest load. FIG. 9 shows a screen shot of a display page from an exemplary GUI that a system administrator can use to define and modify dynamic NAT rules for the connection manager 260.

Figure 10:
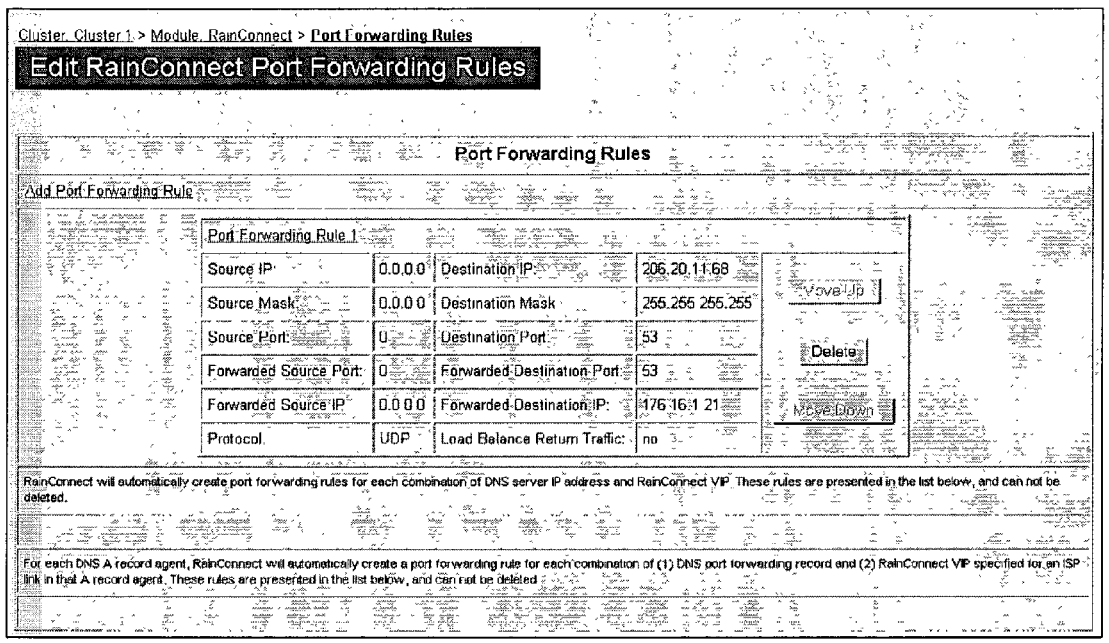
FIG. 10 shows a screen shot of a display page from a graphical user interface that may be used to define port forwarding rules for the connection manager.

With reference again to FIG. 5, in the next operation of the connection manager configuration process, the system administrator provides information that defines one or more port forwarding rules, as represented by the flow diagram box numbered 530. The connection manager 260 uses port forwarding rules to determine the translation from external (i.e., non-LAN) TCP and UDP addresses and ports to internal (i.e., LAN) addresses and ports for inbound packets. For each port forwarding rule, the system administrator provides a set of packet properties, including source IP address, a destination IP address, a source mask, a destination mask, a source port, a destination port, a protocol, a forward destination port, a forward source port, a forward source IP address, and a forward destination IP address. The system administrator also specifies whether the connection manager should perform a load balance for return traffic, as described more fully below. FIG. 10 shows a screen shot of an exemplary GUI that a system administrator may use to define and modify port forwarding rule information for the connection manager 260.

Figure 11:
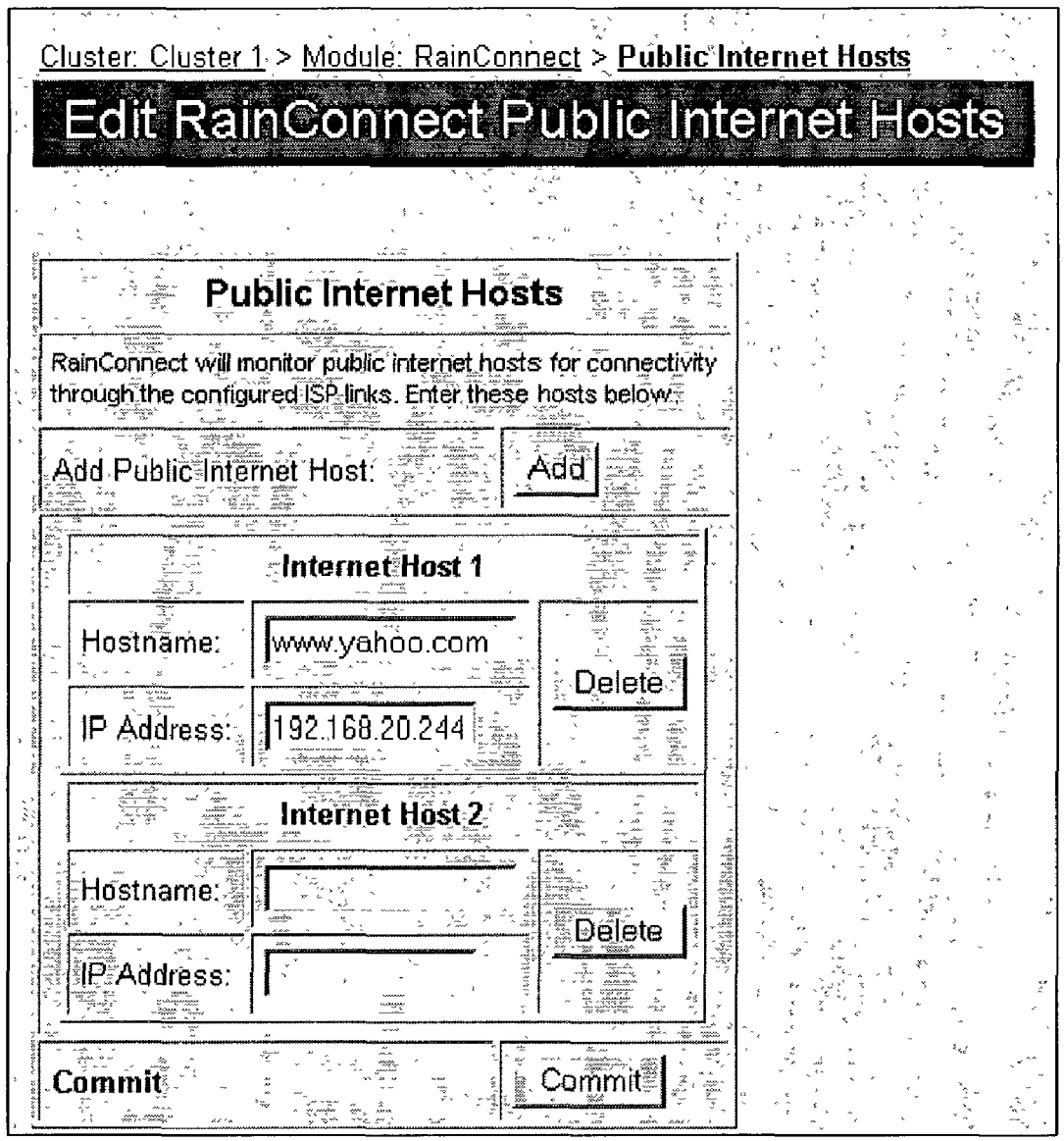
FIG. 11 shows a screen shot of a display page from a graphical user interface that may be used to provide information relating to public Internet hosts used in ISP availability checks by the connection manager.

The next operation in the configuration process is represented by the flow diagram box numbered 540 of FIG. 5. In this operation, the system administrator provides information relating to public network hosts that will be used by the connection manager 260 to check the availability of each ISP that is connected to the LAN 225. For each public network host, the system administrator provides a host name and an IP address. The connection manager 260 will periodically send a ping request to the specified public Internet host(s) in order to check the availability of the ISP connections, as described more fully below. FIG. 11 shows a screen shot of a display page from an exemplary GUI that can be used for entering and modifying public host information into the connection manager 260.

Figure 12:
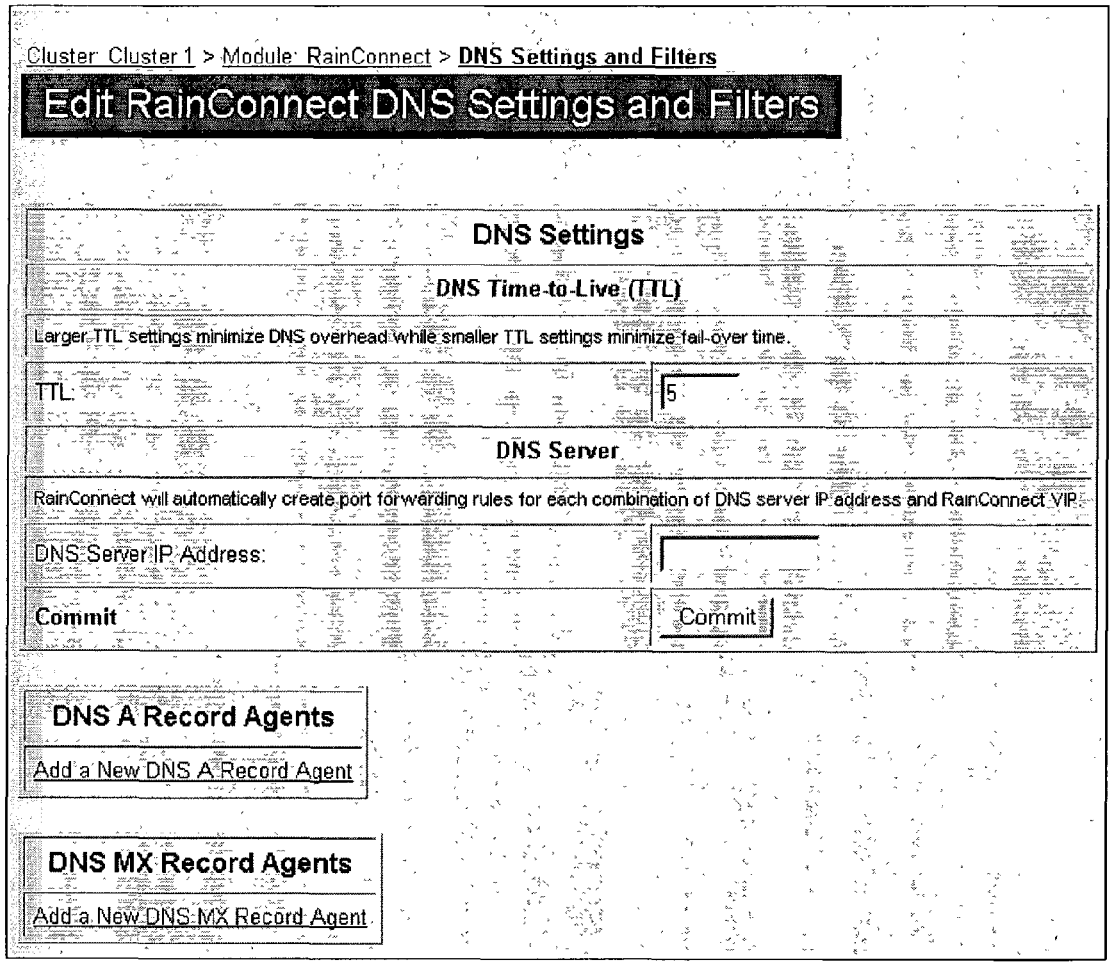
FIG. 12 shows a screen shot of a display page from a graphical user interface that may be used to define DNS settings for the connection manager.

Returning to FIG. 5, in the next operation, the system administrator provides information relating to DNS settings, which the connection manager 260 uses to manage registered domains that are assigned to local services, such as the File Transfer Protocol (FTP) or the World Wide Web (WWW), hosted on the LAN. As mentioned, the connection manager 260 acts as a proxy for one or more authoritative DNS servers of the LAN 225. In this regard, the system administrator provides DNS settings information comprising the IP address of the DNS server and a time-to-live (TTL) setting, which specifies the valid life span of the IP address that is provided in response to a DNS query. A shorter TTL setting will specify that the IP address provided in response to a DNS query is valid for a shorter amount of time. FIG. 12 shows a screen shot of an exemplary GUI that may be used for entering and modifying DNS setting information.

Figure 13:
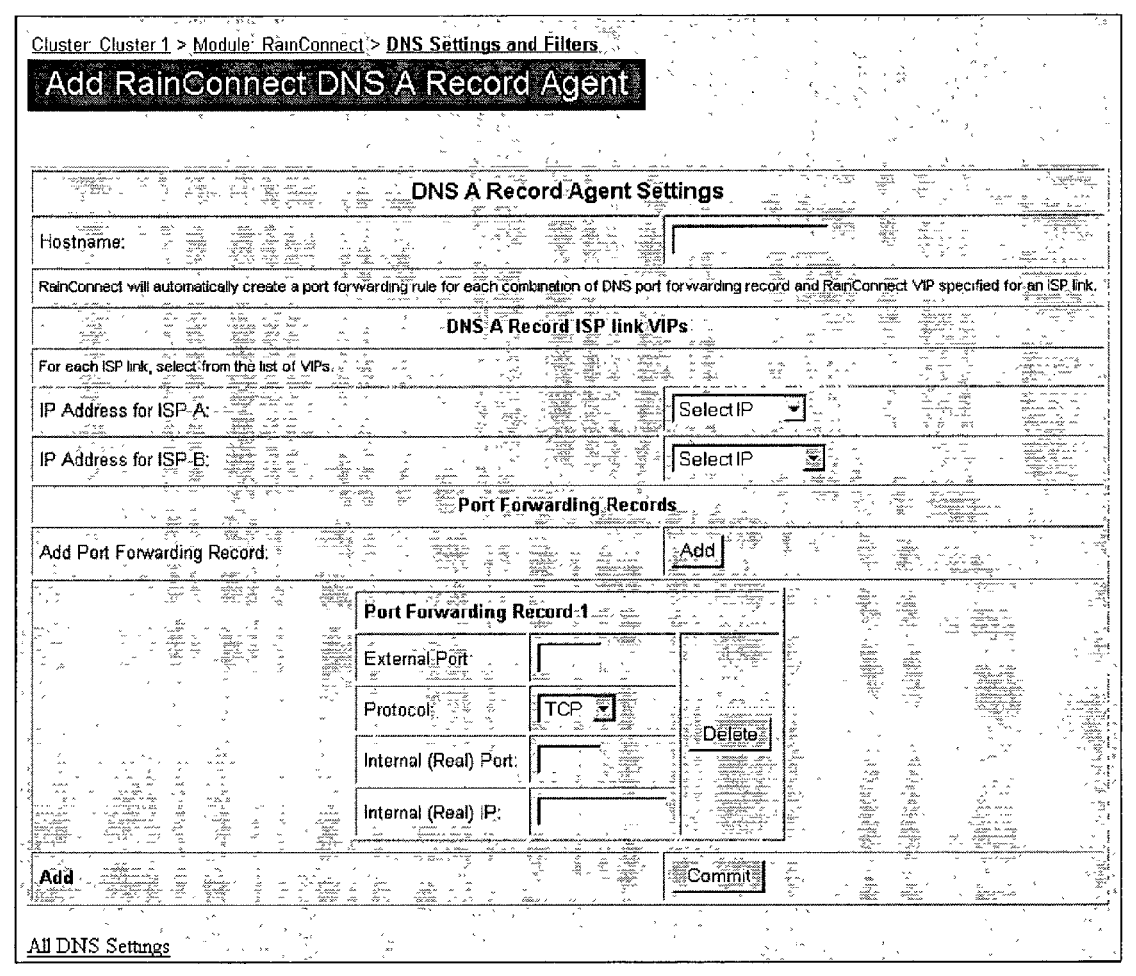

Pursuant to the operation represented by the flow diagram box 550 in FIG. 5, the system administrator defines at least one Record Agent, which specifies the possible IP addresses that the connection manager 260 will advertise in connection with domain name service queries for domains hosted on the LAN. The DNS Record Agent defines the mapping between individual host names and corresponding IP addresses. For each domain on the LAN, the Record Agent definition includes a host name for the domain and a DNS filter hide IP address for each ISP, which is the address that will be publicly advertised for the domain for a selected ISP. This is described in more detail below with reference to the flow diagram shown in FIGS. 15A and 15B. For each Record Agent, the system administrator can also define one or more port forwarding rules. FIG. 13 shows a screen shot of an exemplary GUI that the system administrator uses for entering and modifying this information. The system administrator can also define at least one MX Agent, which specifies the mail servers, if any, for the domains hosted on the LAN. The MX agent provides mappings between addresses of mail servers for domains hosted on the LAN and the domain names.

After the operations described above are performed, the configuration process is then complete. It should be appreciated that the foregoing operations are not limited to being performed in the order shown in the flow diagram of FIG. 4, but can be performed in a different order by the system administrator, or in some cases can be set by default values. In addition, after the initial configuration process is completed, the system administrator may modify any of the configuration information at a later time by accessing edit screens that are part of the connection manager GUI. The connection manager 260 stores the configuration information in a local data store.

Connection Manager Processing of Outbound Packets

Figure 14:
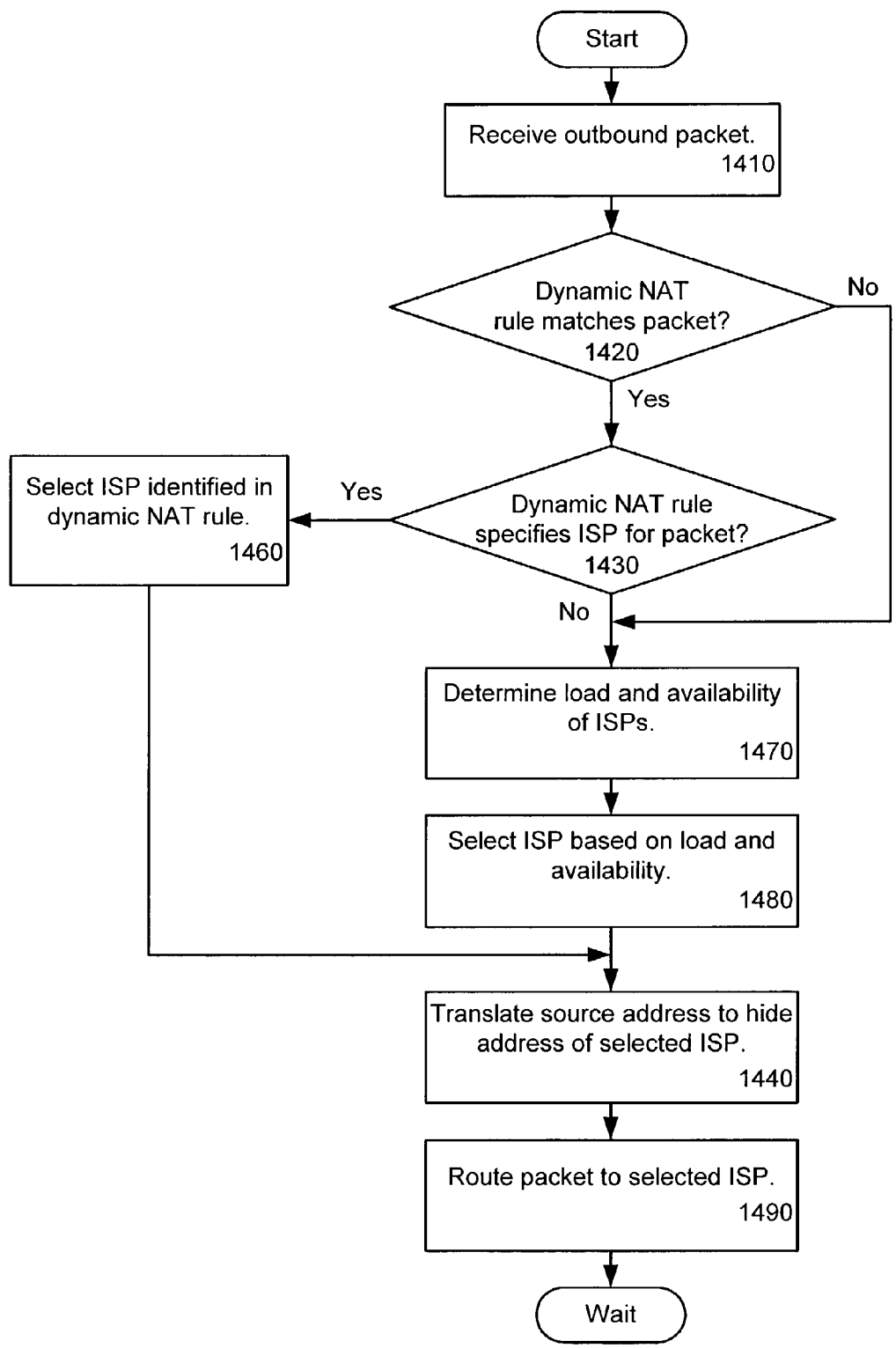
FIG. 14 shows a flow diagram that describes how the connection manager processes outbound packets from host computers on a LAN managed by the connection manager pursuant to one aspect of the invention.

FIG. 14 shows a flow diagram that describes how the connection manager processes outbound packets from host computers on the LAN 225 to an external network, such as the Internet 210. The processing is performed by the outbound module 330 (shown in FIG. 3) of the connection manager 260. In the first operation, represented by the flow diagram box numbered 1410, the connection manager 260 receives an outbound packet from a host computer of the LAN 225 that is managed by the connection manager. As will be known to those of skill in the art, the packet will include a header that identifies the source IP address and the source port for the computer that sent the packet, which will typically be some IP address that is internal to the LAN. The header will also identify a destination IP address and a destination port, which will be external to the LAN, as well as a communication protocol.

In the next operation, represented by the decision box numbered 1420, the connection manager 260 determines whether any dynamic NAT rules match the received packet. In this regard, the connection manager 260 determines whether there is a dynamic NAT rule having a source address, source port, and communication protocol that matches the source address, source port, and communication protocol of the packet. If no dynamic NAT rule matches the packet, a "No" outcome results from the decision box numbered 1420 and the process proceeds to the operation represented by the flow diagram box numbered 1470, which is described below. It should be appreciated that the connection manager 260 can be configured so that there is a default dynamic NAT rule that is used for packets that do not have a specific rule that matches the packet.

If the connection manager 260 identifies a matching dynamic NAT rule for the packet, a "Yes" results from the decision box 1420. The connection manager 260 can maintain the dynamic NAT rules in an ordered list and the first rule in the list that matches the packet is considered the matching rule, halting further rule checking. This eliminates the possibility of multiple matches. The process proceeds to the operation represented by the decision box numbered 1430. In this operation, the connection manager 260 determines whether the connection handling parameter of the matching dynamic NAT rule specifies that the packet should be sent to a specific ISP. As discussed above, the connection handling parameter of a NAT rule specifies whether a packet that matches the rule should be "stuck" to a specific ISP or load balanced. If the matching dynamic NAT rule specifies that the packet should be sent to a specific ISP (a "Yes" result from the decision box 1430), the connection manager 260 selects an ISP to which the packet will be routed. In this regard, the connection manager 260 designates the ISP identified in the connection handling parameter of the dynamic NAT rule as the selected ISP.

In the next operation, represented by the flow diagram box numbered 1440, the connection manager 260 translates the source IP address of the packet to the hide IP address of the selected ISP. That is, the connection manager 260 replaces the source IP address of the packet (which will be the LAN internal address of the computer that sent the packet) with the hide IP address of the selected ISP. As described above, the system administrator will have previously defined a hide IP address for each ISP during the configuration process. As a result of the source IP address translation, the packet will have a source IP address that matches the hide IP address of the selected ISP. Thus, an inbound response to the packet will have the hide IP address of the selected ISP as its destination address. The connection manager 260 may also translate the source port of the packet to a hide port. The connection manager can assign hide ports using a pool of available port designations.

The connection manager 260 can maintain a translation record, such as a table, that keeps track of the address translations (and port translations) that have occurred. The translation record is a mapping between each internal address and the ISP hide address to which it was translated in outbound packets. The connection manager can use the translation records to forward response packets that are received to the correct internal IP address on the LAN.

With reference again to the decision box numbered 1430, the connection handling parameter of the matching NAT rule may have a specified "load balance" rather than a specific ISP. If this is the case, a "No" results from the decision box 1430, which indicates that the connection manager should select an ISP for the packet based on the current load of all of the ISPs connected to the LAN. The process then proceeds to the operation represented by the flow diagram numbered 1470 in FIG. 14, where the connection manager determines the current load on the ISPs connected to the LAN and also determines the availability of the ISPs connected to the LAN. The connection manager outbound module 330 may obtain the availability status of the ISPs by querying the ISP module 310, which monitors the availability of each ISP, as described further below with reference to the flow diagram FIG. 16. Regarding the bandwidth load status, the ISP module 310 can maintain a real time tally of the load on each ISP connection. The ISP module keeps track of the amount of traffic that has been assigned to each ISP connection, such as in terms of the quantity of bytes that have been assigned to each ISP connection during a past time period, according to well-known methods. In one embodiment, the time period is one minute. The ISP module can then compare the quantity of bytes over the time period to the static bandwidth of the ISP connections (which was specified during configuration of the connection manager) to determine the actual load on each ISP connection.

In the next operation, represented by the flow diagram box numbered 1480, the connection manager 260 selects an ISP to which to route the outbound packet for delivery to the Internet. The selection of the ISP is based on the current bandwidth load and availability status of the ISPs that are connected to the LAN. In this regard, the connection manager 260 can select the ISP with the lowest load among the available ISPs. This will result in the connection manager 260 dynamically disregarding unavailable ISPs for delivery of the packet and also result in a load balancing of outbound packets to the ISP connections.

The process then proceeds to the operation represented by the flow diagram box numbered 1440 of FIG. 14, where the connection manager 260 translates the source IP address of the packet to the hide IP address of the selected ISP, as was described above. The connection manager 260 then routes the packet to a data path associated with the selected ISP according to well-known processes, as represented by the flow diagram box numbered 1490. This can be accomplished, for example, by forwarding the packet to the local access router that is associated with the selected ISP, as will be known to those skilled in the art. The outbound module 330 of the connection manager 260 then proceeds to a wait state, where it waits for further outbound packets.

Connection Manager Processing of Inbound Packets

Figure 15A:
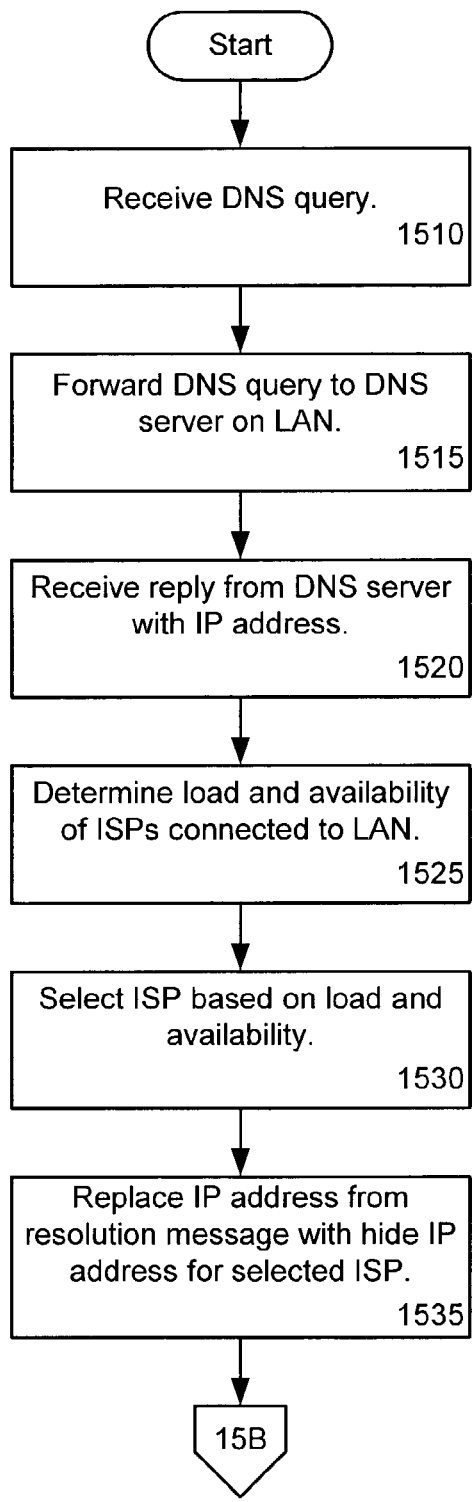
FIGS. 15A and 15B show a flow diagram that describes how the connection manager processes inbound packets from an external network to host computers on a LAN managed by the connection manager pursuant to one aspect of the invention.
Figure 15B:
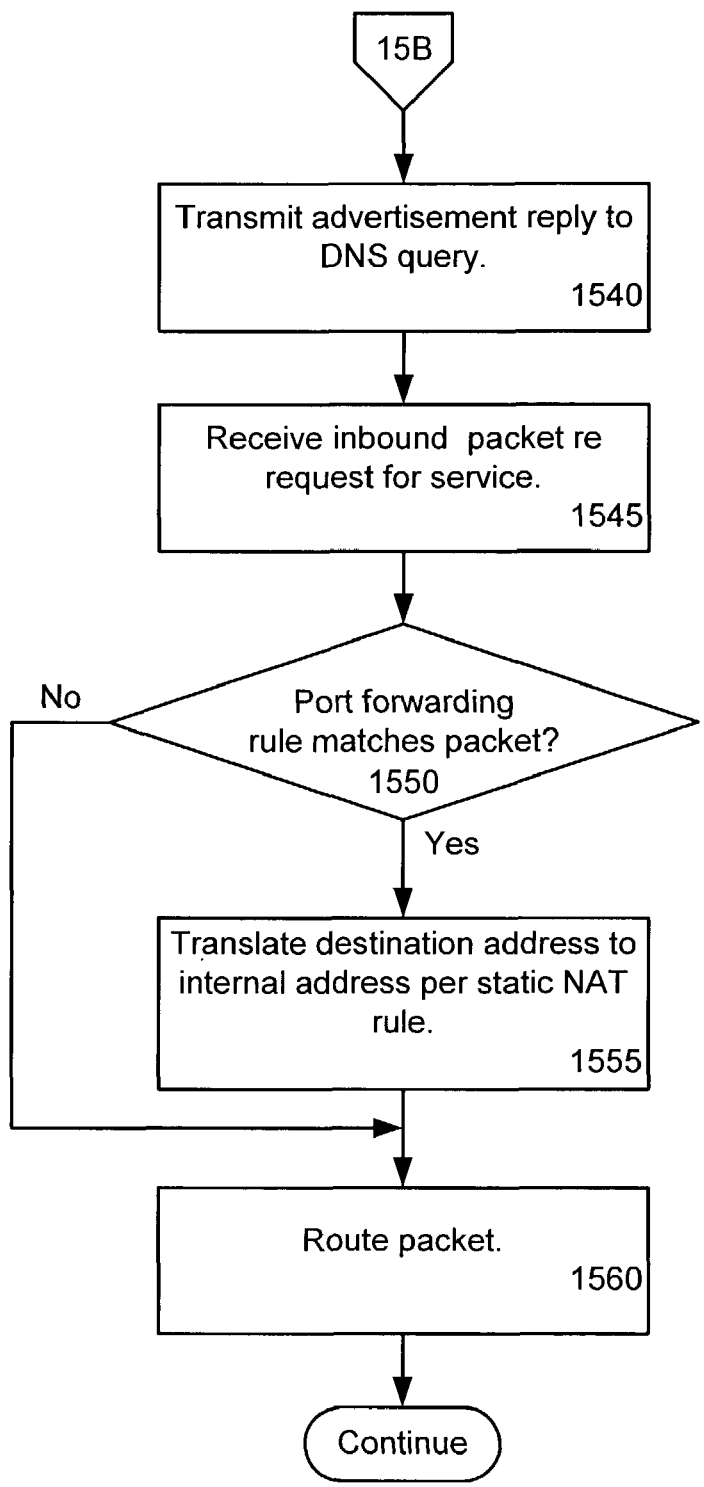

FIGS. 15A and 15B show a flow diagram that describes how the connection manager 260 handles inbound packets from an external network, such as the Internet 210, for delivery to host computers on the LAN managed by the connection manager. In the first operation, represented by the flow diagram box numbered 1510, the connection manager 260 intercepts an inbound DNS query relating to a server hosted on the LAN 225. The DNS query will be bound for a DNS server that the system administrator defined during the connection manager configuration process, such as the DNS server 237 shown in FIG. 1.

Figure 1:
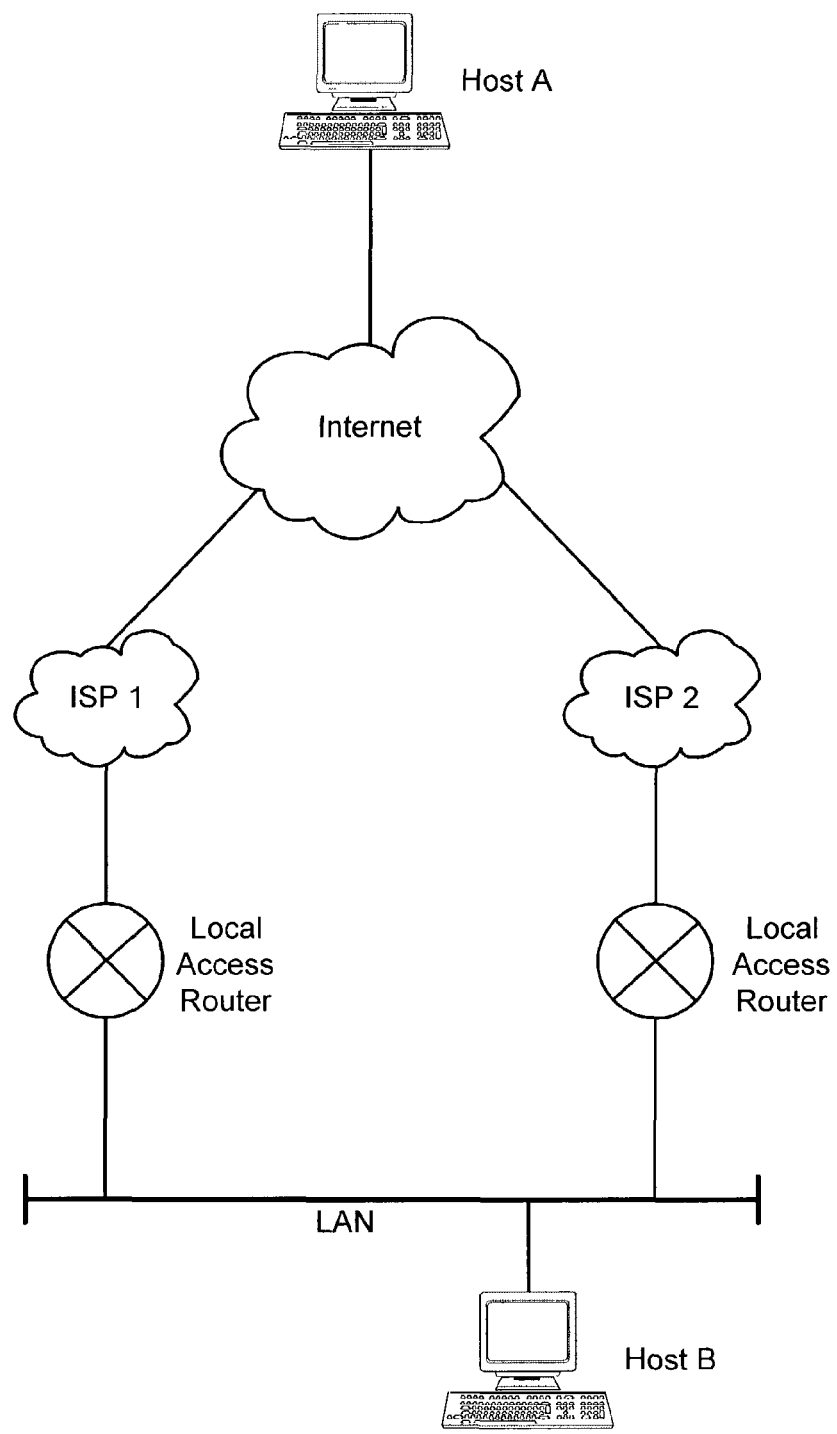
FIG. 1 is a diagram of a conventional multi-homed network system.

In the next operation, represented by the flow diagram box numbered 1515, the connection manager 260 forwards the DNS query to the authoritative DNS server for the domain associated with the request, such as the DNS server 237 shown in FIG. 1. The DNS server that receives the forwarded DNS request will then perform a lookup for an IP address associated with the domain name specified in the request according to well-known methods. In an alternative embodiment, the DNS server is incorporated into the connection manager 260 so that the connection manager can respond directly to DNS query messages without forwarding the DNS query message to an external DNS server.

In the next operation, represented by the flow diagram box numbered 1520, the connection manager receives a response from the DNS server, the response comprising a resolution message regarding the DNS query. The resolution message will contain an IP address that was registered in association with the domain name specified in the request. The IP address will be an IP address for a server machine that is hosted on the LAN and may be part of a range of public IP addresses that was assigned by one of the ISPs that provides Internet service to the LAN. The connection manager 260 knows the range of IP addresses for each ISP, as the system administrator provided this information during configuration. Thus, the connection manager can determine the ISP with which the IP address contained in the resolution message is associated by comparing the IP address with the range of IP addresses for each ISP and identifying ISP that assigned the IP address.

The next operation is represented by the flow diagram box numbered 1525, where the inbound module 320 of the connection manager obtains the current bandwidth load and availability status for the ISPs connected to the LAN. The inbound module 320 can obtain the information from the ISP module 310, which keeps track of the load and availability status of the ISPs. The connection manager 260 then selects an ISP for transmission of a response to the DNS query, as represented by the flow diagram box numbered 1530 of FIG. 15A. In one configuration, the connection manager 260 selects the ISP with the lowest load among the available ISPs.

In the next operation, the connection manager 260 replaces the domain name IP address obtained from the resolution message of the DNS server with the hide IP address for the selected ISP, as represented by the flow diagram box numbered 1535 of FIG. 15A. As discussed above, during the DNS configuration process, the system administrator defined the hide IP address to use for each ISP. Thus, the connection manager will respond to the DNS query by advertising the publicly-accessible IP address of the available ISP with the lowest load, rather than the actual IP address that was returned by the DNS server in the resolution message. The connection manager 260 then creates a port forwarding rule that maps the advertised DNS IP address to the actual IP address, so that when a reply is received, the connection manager 260 can forward the reply to the correct IP address on the LAN.

In the next operation, the connection manager 260 transmits a DNS query response message in response to the DNS query, the message being sent to the Internet 210 along a data path associated with the selected ISP, as represented by the flow diagram box numbered 1540 in FIG. 15B. The query message will advertise the hide IP address for the selected ISP so that the computer that originally submitted the DNS query will respond to the hide IP address for the selected ISP.

In the next operation, represented by the flow diagram box numbered 1545 of FIG. 15B, the connection manager 260 receives an inbound packet comprising a request for a service provided by one of the servers on the LAN, such as to provide a World Wide Web page. The connection manager 260 then determines whether the inbound packet matches any of the port forwarding rules maintained in memory, as represented by the decision box numbered 1550. A port forwarding rule matches a packet when the destination IP address is identical to a destination IP address in the port forwarding rule. The port forwarding rules can also specify a communication protocol as a basis for whether the rule matches a packet. The port forwarding rules provide a translation from an external destination address and port to an internal destination address and port, wherein the external destination address is typically the hide address of an ISP connected to the LAN.

If the connection manager 260 identifies a port forwarding rule that matches the inbound packet (a "Yes" result from the decision box 1550), the connection manager translates the destination IP address in the packet to the forward destination IP address specified in the rule (the internal address to which the external address is mapped). This is represented by the flow diagram box numbered 1560 in FIG. 15B. The connection manager then routes the packet to the LAN machine with the translated destination IP address, as represented by the flow diagram box numbered 1565. The port forwarding rule can also specify a forward destination port to which to route the packet.

With reference again to the decision box numbered 1550, the connection manager might have not found a matching port forwarding rule, thereby resulting in a "No" output. In such a case, the connection manager 260 simply routes the packet to the destination IP address on the LAN without performing any translation.

Monitoring of ISP Availability

Figure 16:
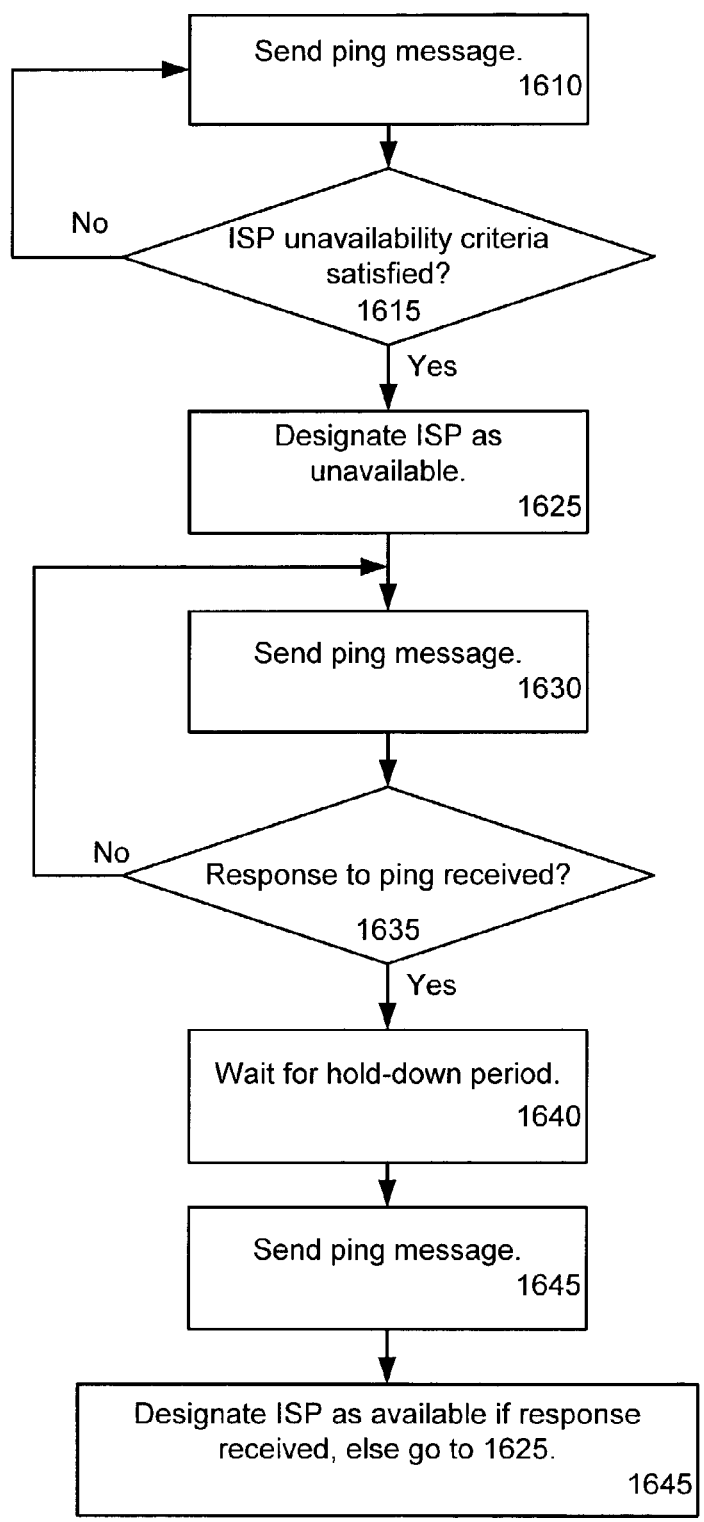
FIG. 16 shows a flow diagram that describes how the connection manager monitors the availability of ISPs connected to a LAN pursuant to one aspect of the invention.

FIG. 16 is a flow diagram that describes the process of monitoring the availability of ISPs. The ISP module 310 of the connection manager 260 performs the process of FIG. 16 in connection with ISPs that have been configured for management by the connection manager 260. As described below, the connection manager 260 monitors the availability of a particular ISP by periodically sending a ping message to an IP address such that the ping message must travel along a data path of the ISP. An ISPs data path can include, for example, a local access router for the ISP, a WAN circuit controlled by the ISP, a gateway router controlled by the ISP, and the ISP backbone network.

In the first operation, represented by the flow diagram box numbered 1610, the connection manager 260 sends a ping message to a specific IP address, the ping message being sent along a data path that is associated with the ISP. The connection manager 260 sends ping messages to the IP address at a frequency defined by the ping interval that the system administrator specified during configuration of the connection manager. The connection manager 260 can, for example, send a ping message to a public Internet host that was defined during the connection manager configuration process shown in FIG. 4. The connection manager 260 can also ping any other IP address that is associated with the ISP. For example, the connection manager can send a ping message to a gateway computer that is controlled by the ISP or to any IP address that is located along a data path controlled by the ISP. Those skilled in the art will be knowledgeable of the processes involved with pinging an IP address.

In the next operation, represented by the decision box numbered 1615, the connection manager 260 determines whether unavailability criteria has been satisfied for the ISP. The unavailability criteria is the criteria that the connection manager uses to designate an ISP as unavailable. In one embodiment, the unavailability criteria simply comprises that no reply has been received in response to a ping message within a predetermined time period after sending the ping message. In another embodiment, the criteria comprises that the error ratio for an IP address has dropped below the error threshold that was specified during the connection manager configuration process. As described above, the error ratio is defined as the quantity of ping responses received divided by the quantity of pings sent, for a particular IP address associated with the ISP. The particular criteria that is used for determining unavailability can be set by the system administrator during configuration or it can be set according to system requirements by the administrator. If the unavailability criteria has not been satisfied (a "No" result from the decision box 1615), the process proceeds back to the operation of the flow diagram box 1610, where the connection manager 260 continues to check the availability of the ISP by sending ping messages to the IP address.

If the unavailability criteria has been satisfied (a "Yes" result from the decision box 1615), the process proceeds to the operation represented by the flow diagram box numbered 1625. In this operation, the connection manager 260 designates the ISP as unavailable as a result of the unavailability criteria being satisfied for the ISP. The ISP module 310 of the connection manager 260 can then notify the inbound module 320 and/or outbound module 330 that the ISP has been designated as unavailable. Alternately, the ISP module 310 can simply store the information regarding the ISP status and convey the status only in response to a query from one of the other modules.

In the next operation, represented by the flow diagram box numbered 1630, the connection manager 260 again pings the IP address and waits for a response. The connection manager does this in an attempt to determine whether the ISP has become available again. The process then proceeds to the operation represented by the decision box numbered 1635. If the connection manager 260 receives no response to the ping message (a "No" result), the connection manager continues to ping the IP address pursuant to the operation represented by the flow diagram box 1630. If the connection manager 260 receives a reply to the ping message (a "Yes" result from the decision box 1635) the connection manager 260 waits for the amount of time identified in the hold-down timer period (flow diagram box numbered 1640), which the system administrator defined during configuration process.

The connection manager 260 then pings the IP address again, as represented by the flow diagram box numbered 1645. In the operation represented by the flow diagram box numbered 1650, the connection manager designates the ISP as "available" if a response is received as a result of the ping message. This is an indication that the IP address associated with the ISP has been available for the amount of time specified in the hold-down timer period. If no response is received, then the ISP is still determined to be unavailable and the process returns to the operation represented by the flow diagram box numbered 1625.

The present invention has been described above in terms of one or more embodiments so that an understanding of the present invention can be conveyed. There are, however, many configurations for ISP load balancing systems not specifically described herein but with which the present invention is applicable. The present invention should therefore not be seen as limited to the particular embodiments described herein, but rather, it should be understood that the present invention has wide applicability with respect to ISP load balancing generally. All modifications, variations, or equivalent arrangements and implementations that are within the scope of the attached claims should therefore be considered within the scope of the invention.

We claim:

1. A method of handling a computer network communication for a local network that is connected to an external network through multiple service providers, the method comprising:
   receiving a communication packet that is inbound or outbound with respect to the local network;
   determining for such packet an availability status for each of the service providers by transmitting a plurality of ping messages to a network host associated with one service provider, waiting for an acknowledgment from the network host, and determining that the one service provider is unavailable if a ratio of the quantity of acknowledgments received divided by the quantity of ping messages sent is less than a predetermined value;
   upon determining that said one service provider is unavailable, transmitting ping messages to said network host; upon receiving a response to said ping messages indicating that said one service provider is available, waiting for a hold-down period and transmitting another ping message to said network host; and designating said service provider as being available if a response is received to said another ping message;
   determining for such packet a bandwidth load status for each of the service providers;
   selecting a service provider based upon the availability status and bandwidth load status of the service providers; and
   associating the received packet with the selected service provider.

2. A method as defined in claim 1, wherein selecting a service provider based upon the availability status and bandwidth load status of the service providers comprises selecting the service provider that has the lowest bandwidth load among the available service providers.

3. A method as defined in claim 1, wherein the packet is outbound with respect to the local network and wherein associating the received packet with the selected service provider comprises transmitting the packet to the external network via the selected service provider.

4. A method as defined in claim 3, wherein the external network comprises the Internet and wherein the packet contains a non-publicly routable source IP address, and additionally comprising replacing the non-publicly routable source IP address with a hide IP address comprising a publicly routable source IP address selected from a range of IP addresses associated with the selected service provider.

5. A method as defined in claim 4, additionally comprising maintaining a record that defines the hide IP addresses for each service provider connected to the local network.

6. A method as defined in claim 1, wherein the received packet is an inbound packet and relates to a DNS query request to translate a domain name into an IP address for a domain hosted in the local network, the method additionally comprising:
   forwarding the DNS query request to a domain name server of the local network;
   receiving a resolution message from the domain name server, wherein the resolution message contains a first IP address in a range of IP addresses corresponding to multiple service providers associated with the domain name;
   determining a current availability status and bandwidth load of each of said multiple services providers, said selecting comprising selecting a service provider based upon current availability status and bandwidth load;
   changing the first IP address in the resolution message to a hide IP address for the selected service provider;
   and wherein associating the received packet with the selected service provider comprises responding to the DNS query request by sending a DNS query response message that identifies the hide IP address for the selected service provider as the IP address for the domain name.

7. A method as defined in claim 6, wherein the DNS query response message is sent to the external network via the selected service provider.

8. A method as defined in claim 6, wherein determining a service provider with which the resolution message is associated comprises identifying a service provider that assigned the first IP address to the local network.

9. A method as defined in claim 6, additionally comprising creating a port forwarding rule that maps the hide IP address of the selected service provider to the first IP address.

10. A method as defined in claim 1, wherein determining an availability status for a service provider comprises
    determining that the service provider is unavailable if no acknowledgement message is received within a predetermined time period of sending a ping message.

11. A method as defined in claim 1, wherein the method is performed at a local network that is inbound from local access routers associated with the service providers.

12. A method as defined in claim 6, wherein the domain name server is located at a computer of the local network and wherein the computer performs the claimed method.

13. A method as defined in claim 1, wherein the availability status for each of the service providers and the bandwidth load status for each of the service providers is determined using configuration information for each service provider, the configuration information for each service provider including a network address for a local access router for the service provider, a range of network addresses provided to the local network by the service provider, and a static inbound bandwidth and a static outbound bandwidth for the service provider.

14. A method as defined in claim 1 additionally comprising:
    obtaining service provider configuration information for each service provider that connects the local network to the external network, wherein the service provider configuration information for each service provider includes a public IP address range assigned by the service provider to the local network, a hide IP address range that will be publicly advertised over the external network for the service provider, and an inbound and outbound static bandwidth for the service provider;

obtaining dynamic NAT rule definitions that are used to determine which service provider should be used for transmitting outbound communications to the external network from the local network;

obtaining port forwarding rules that are used to determine translations from external network addresses to local network addresses;

obtaining at least one external network address that is used to check the availability of the service providers; and obtaining DNS settings that define external network addresses that will be advertised in connection with DNS queries.

15. A local computer network having connection manager embodied on a computer device that handles computer network communications for the local network, wherein the local computer network is connected to an external network through multiple service providers and wherein the connection manager performs operations comprising: receiving a communication packet that is inbound or outbound with respect to the local network; determining for such packet an availability status for each of the service providers by transmitting a plurality of ping messages to a network host associated with one service provider, waiting for an acknowledgment from the network host, and determining that the one service provider is unavailable if a ratio of the quantity of acknowledgments received divided by the quantity of ping messages sent is less than a predetermined value; upon determining that said one service provider is unavailable, transmitting ping messages to said network host; upon receiving a response to said ping messages indicating that said one service provider is available, waiting for a hold-down period and transmitting another ping message to said network host; and designating said service provider as being available if a response is received to said another ping message; determining for such packet a bandwidth load status for each of the service providers; selecting a service provider based upon the availability status and bandwidth load status of the service providers; and associating the received packet with the selected service provider.

16. The local computer network of claim 15, wherein the packet is outbound with respect to the local network and wherein associating the received packet with the selected service provider comprises transmitting the packet to the external network via the selected service provider.

17. The local computer network of claim 15, wherein the received packet is an inbound packet and relates to a DNS query request to translate a domain name into an IP address for a domain hosted in the local network, and wherein the connection manage performs operations further comprising:

forwarding the DNS query request to a domain name server of the local network;

receiving a resolution message from the domain name server, wherein the resolution message contains a first IP address in a range of IP addresses corresponding to multiple service providers associated with the domain name;

determining a current availability status and bandwidth load of each of said multiple services providers, said selecting comprising selecting a service provider based upon current availability status and bandwidth load;

changing the first IP address in the resolution message to a hide IP address for the selected service provider;

and wherein associating the received packet with the selected service provider comprises responding to the DNS query request by sending a DNS query response message that identifies the hide IP address for the selected service provider as the IP address for the domain name.

18. A connection manager system for handling a computer network communication for a local network that is connected to an external network through multiple service providers, the system comprising:

a memory in which instructions and data are stored;

a processor, coupled to the memory, such that the processor receives the instructions stored in the memory and executes the instructions to perform operations comprising:

receiving a communication packet that is inbound or outbound with respect to the local network;

upon determining that said one service provider is unavailable, transmitting ping messages to said network host; upon receiving a response to said ping messages indicating that said one service provider is available, waiting for a hold-down period and transmitting another ping message to said network host; and designating said service provider as being available if a response is received to said another ping message;

determining for such packet an availability status for each of the service providers by transmitting a plurality of ping messages to a network host associated with one service provider, waiting for an acknowledgment from the network host, and determining that the one service provider is unavailable if a ratio of the quantity of acknowledgments received divided by the quantity of ping messages sent is less than a predetermined value;

determining for such packet a bandwidth load status for each of the service providers;

selecting a service provider based upon the availability status and bandwidth load status of the service providers; and associating the received packet with the selected service provider.

19. A system as defined in claim 18, wherein the processor selects a service provider based upon the availability status and bandwidth load status of the service providers by selecting the service provider that has the lowest bandwidth load among the available service providers.

20. A system as defined in claim 18, wherein the packet is outbound with respect to the local network and wherein the processor associates the received packet with the selected service provider by transmitting the packet to the external network via the selected service provider.

21. A system as defined in claim 18, wherein the received packet is an inbound packet and relates to a DNS query request to translate a domain name into an IP address for a domain hosted in the local network, and the processor executed method further comprising:

forwarding the DNS query request to a domain name server of the local network;

receiving a resolution message from the domain name server, wherein the resolution message contains a first IP address in a range of IP addresses corresponding to multiple service providers associated with the domain name;

determining a current availability status and bandwidth load of each of said multiple services providers, said selecting comprising selecting a service provider based upon current availability status and bandwidth load;

changing the first IP address in the resolution message to a hide IP address for the selected service provider;

and wherein associating the received packet with the selected service provider comprises responding to the DNS query request by sending a DNS query response message that identifies the hide IP address for the selected service provider as the IP address for the domain name.

22. A program product for use in a computer that executes program steps recorded in a non-transitory computer-readable media to perform a method of handling a computer network communication for a local network that is connected to an external network through multiple service providers, the program product comprising: a recordable media; a plurality of computer-readable instructions executable by the computer to perform a method comprising: receiving a communication packet that is inbound or outbound with respect to the local network; upon determining that a service provider is unavailable, transmitting ping messages to said network host; upon receiving a response to said ping messages indicating that said one service provider is available, waiting for a hold-down period and transmitting another ping message to said network host; and designating said service provider as being available if a response is received to said another ping message; determining for such packet an availability status for each of the service providers by transmitting a plurality of ping messages to a network host associated with one service provider, waiting for an acknowledgment from the network host, and determining that the one service provider is unavailable if a ratio of the quantity of acknowledgments received divided by the quantity of ping messages sent is less than a predetermined value; determining for such packet a bandwidth load status for each of the service providers; selecting a service provider based upon the availability status and bandwidth load status of the service providers; and associating the received packet with the selected service provider.

23. A program product as defined in claim 22, wherein selecting a service provider based upon the availability status and bandwidth load status of the service providers comprises selecting the service provider that has the lowest bandwidth load among the available service providers.

24. A program product as defined in claim 22, wherein the packet is outbound with respect to the local network and wherein associating the received packet with the selected service provider comprises transmitting the packet to the external network via the selected service provider.

25. A program product as defined in claim 22, wherein the received packet is an inbound packet and relates to a DNS query request to translate a domain name into an IP address for a domain hosted in the local network, the method additionally comprising:

forwarding the DNS query request to a domain name server of the local network;

receiving a resolution message from the domain name server, wherein the resolution message contains a first IP address in a range of IP addresses corresponding to multiple service providers associated with the domain name;

determining a current availability status and bandwidth load of each of said multiple services providers, said selecting comprising selecting a service provider based upon current availability status and bandwidth load;

changing the first IP address in the resolution message to a hide IP address for the selected service provider;

and wherein associating the received packet with the selected service provider comprises responding to the DNS query request by sending a DNS query response message that identifies the hide IP address for the selected service provider as the IP address for the domain name.

\* \* \* \* \*